Nov. 26, 1935.  B. LOEFFLER  2,021,942
WELDED HEAD FOR INTERNAL COMBUSTION ENGINES
Filed Oct. 26, 1934  2 Sheets—Sheet 1
Fig.1
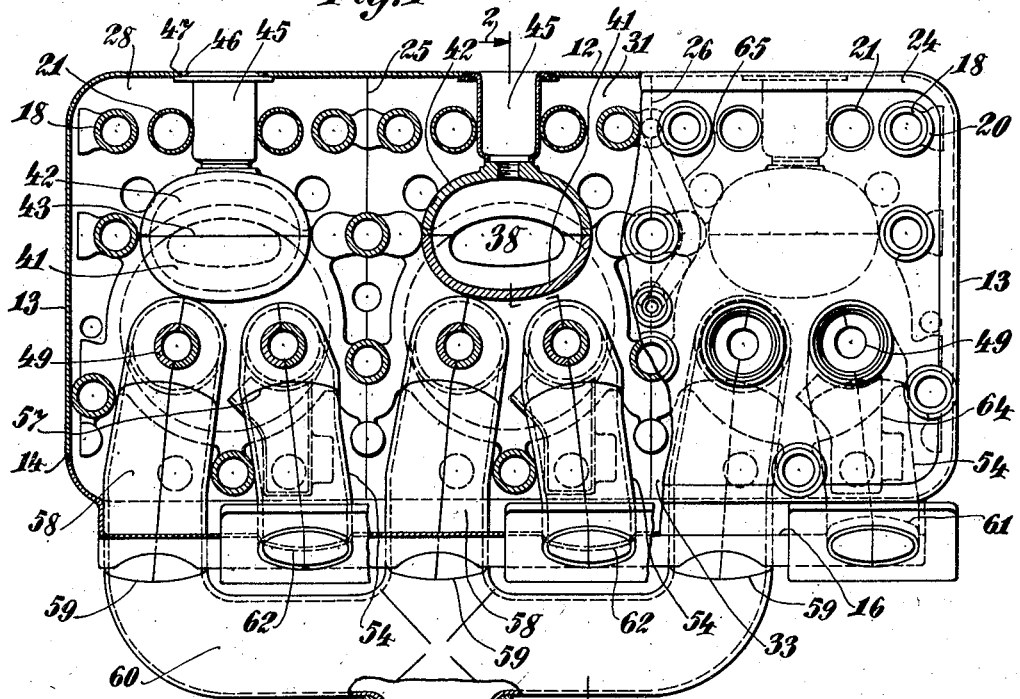
Fig.2
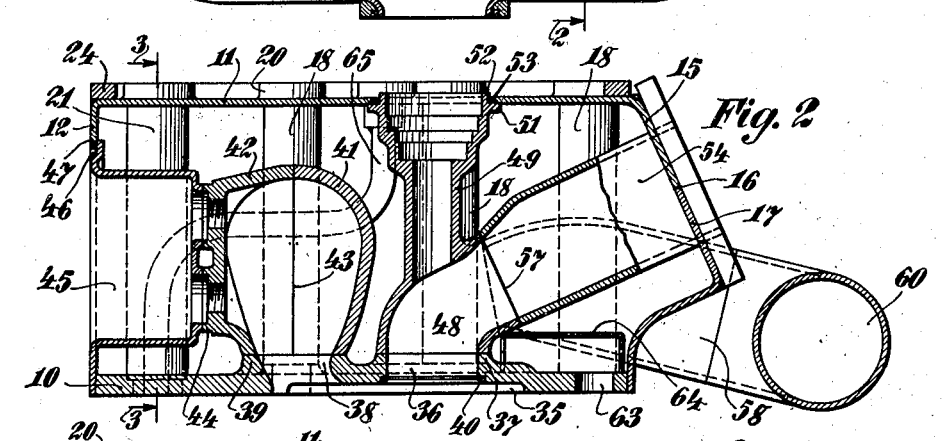
Fig.3
INVENTOR:
Bruno Loeffler,
BY
HIS ATTORNEYS

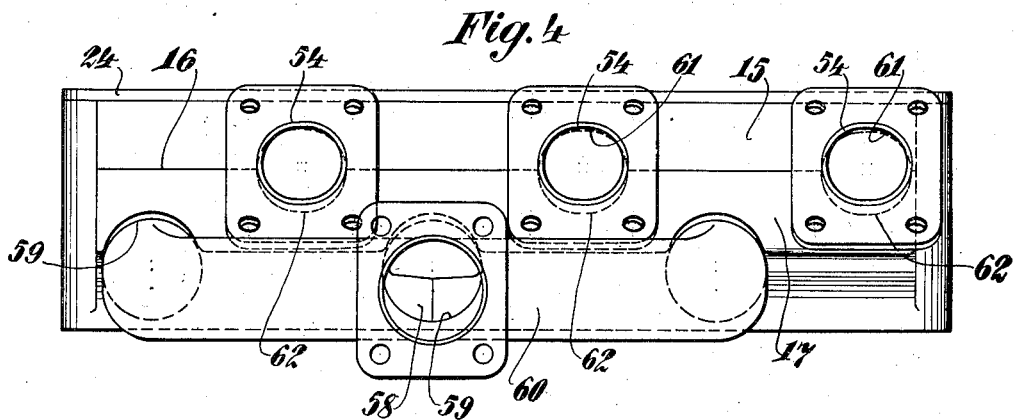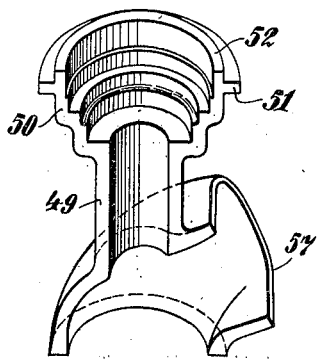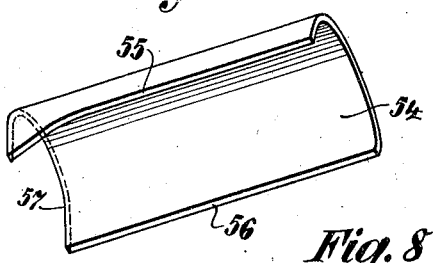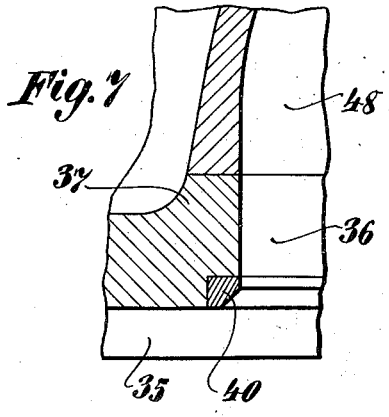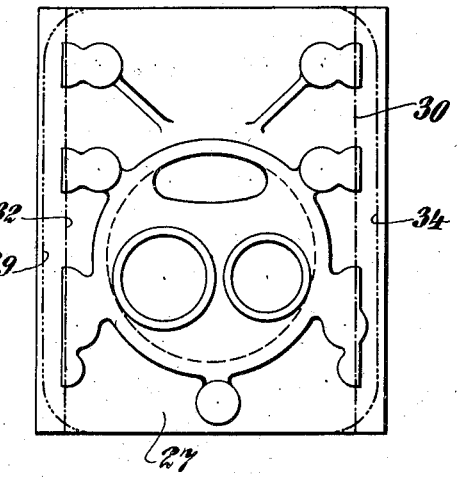

Patented Nov. 26, 1935

2,021,942

UNITED STATES PATENT OFFICE 2,021,942

WELDED HEAD FOR INTERNAL COMBUSTION ENGINES

Bruno Loeffler, Plainfield, N. J., assignor to International Motor Company, New York, N. Y., a corporation of Delaware Application October 26, 1934, Serial No. 750,147

11 Claims. (Cl. 123—195)

The present invention relates to heads for internal combustion engines and embodies, more specifically, an improved welded head construction wherein the elements of the head are so designed as to facilitate the welding operations necessary to assemble the elements and to provide adequate strength for the various elements to withstand the stresses impressed thereon during operation.

In applicant's copending application Ser. No. 694,044 for head for gasoline motor, there is described a head for an internal combustion engine including a combustion chamber spark plug recesses, inlet and exhaust pipes and ports, and valve guides. In this prior structure the elements are assembled by welding operations which necessitate the formation of the several elements in such fashion as to enable the welding to take place, the elements being formed with fillets or chamfered portions along the edges to be welded.

In order that a head may be provided having a structure formed of a plurality of elements which are readily formed by drop forging operations and which are formed to be welded along abutting surfaces, the present invention has been designed and an object thereof is to provide a welded head structure, the elements of which are greatly simplified over the corresponding elements of previous designs and the assembly of which involves welding operations which are effected more easily than the corresponding operations required in existing designs.

A further object of the invention is to provide a head of the above character wherein the elements subjected to severe stresses during operation are formed in an improved manner to render them more capable of assuming the stresses impressed thereon.

A further object of the invention is to provide a head of the above character having a valve seat and plate structure adapted to carry away heat from the valve seat more rapidly than in existing designs.

A further object of the invention is to provide a head of the above character wherein the inlet and exhaust pipes are formed integral with the corresponding valve stem guides to insure effective operation of the mechanism.

Further objects, not specifically enumerated above, will be apparent as the invention is described in greater detail in connection with the accompanying drawings, wherein:

Figure 1 is a plan view, partly broken away, and in horizontal section, showing a head constructed in accordance with the present invention.

Figure 2 is a view in vertical section, taken on line 2—2 of Figure 1, and looking in the direction of the arrows.

Figure 3 is a view in section, taken on line 3—3 of Figure 2, and looking in the direction of the arrows.

Figure 4 is a view in front elevation showing a head constructed in accordance with the present invention, and looking from the right as viewed in Figure 2.

Figure 5 is a view in isometric projection showing a portion of the valve guide structure constructed in accordance with the present invention.

Figure 6 is a view in isometric projection showing a portion of an inlet and exhaust pipe constructed in accordance with the present invention.

Figure 7 is an enlarged detail view in section showing the valve seat structure of the present invention.

Figure 8 is a plan view showing a drop forging blank from which three different sections are formed in the manufacture of a head in accordance with the present invention.

Referring to the above drawings, a head is shown as being formed with a bottom plate 10 and top plate 11. The top plate is preferably formed integral with a back wall 12 and end walls 13, the end walls terminating at 14, as shown in Figure 1. The top plate 11 is also formed with a front downwardly extending wall portion 15 which terminates in a horizontal edge 16 which is adapted to be welded to a front plate 17. The front plate 17 extends along the front of the head and is formed to be welded to the adjacent edges of the end walls 13 at the point indicated at 14 in Figure 1.

The end walls 13 and front and back walls 12 and 17, respectively, are welded to the sides of the bottom plate 10, tubes 18 being provided to space the bottom plate 10 and the top plate 11 properly. In this connection, the bottom plate 10 is formed with bosses 19 against which the bottom ends of the tubes 18 abut to be welded thereto, the upper ends of the tubes 18 being welded to cylindrically flanged portions 20 which are formed on the top plate 11. Also between the top plate 11 and the bottom plate 10, push rod tubes 21 are secured, the tubes being fuse-welded at 22 in recesses 23 which are formed in the bottom plate 10. The upper ends of the tubes 21 are suitably welded to the top plate 11 as shown in Figure 3. About the periphery of the top plate 11 an oil ring 24 is welded to form a shallow reservoir on top of the head.

The bottom plate 10 is formed of three sections which are welded together along the lines 25 and 26 in Figure 1. These sections are formed from similar drop forgings 27 of the character shown in outline in solid lines in Figure 8. The left hand section 28 of the bottom plate, as viewed in Figure 1, is formed from one of the forgings 27 by machining the left hand side of the forging along the dash and tripple dot line 29 in Figure 8 and along the dot and dash line 30 at the right of the forging shown in Figure 8. The central section 31 of the bottom plate is formed from the forging 27 by machining along the dot and dash line 30 at the right of Figure 8, and along the dot and dash line 32 at the left of Figure 8. The right hand bottom plate section 33 is formed by machining the forging 28 along the dash and double dotted line 34, at the right of Figure 8, and along the dash and dot line 32 at the left of Figure 8. As shown in Figure 1, the sides of the central section 31 are welded to the adjacent sides of the end sections 28 and 33, thus enabling the bottom plate to be formed of three sections, each of which is formed from integral forgings.

Each of the sections 28, 31 and 33 is formed with a recessed portion 35 and a plurality of ports 36 to form the inlet and outlet ports of each cylinder. The ports 36 are formed in bosses 37, the upper side of which lies in a common plane. The bottom plate sections are also formed with apertures 38 in bosses 39 upon which combustion chambers are adapted to be welded. The upper extremities of the bosses 39 lie in the plane of the tops of the bosses 37 to facilitate the formation of the elements and the assembly thereof.

Each of the exhaust ports 36 has a valve seat 40 welded therein, these valve seats being formed of any of the well known compositions now available for such purpose. Inasmuch as the valve seats are welded directly in the bottom plate sections they form an integral part of the bottom plate and enable the thickness of the metal in the deck adjacent such seats to be reduced to a minimum. This results in a rapid conducting of the heat of the valve seat to the cooling fluid within the head and results in better operation.

Upon the bosses 39 combustion chambers are welded, these chambers being formed of sections 41 and 42 which are welded together along a median line shown at 43 in Figure 2. The sections 42 are formed with bosses 44 to which cooperating portions of spark plug recessed forming members 45 are welded. These recessed members 45 are welded at 46 in recesses 47 which are formed in the rear wall 12 of the head. The bosses 44 are drilled and tapped to receive the spark plug in an obvious manner.

As shown in Figures 5 and 6, the inlet and exhaust pipes are formed of a plurality of sections each of which comprises a drop forging which is adapted to be welded to a co-operating and mating element to complete the cross section of the pipe. Welded to the proper bosses 37 are exhaust pipe elbows 48 each of which is formed of two halves comprising drop-forgings of the character illustrated in Figure 5. These forgings are formed with valve guides 49 having wells 50 formed thereon, the wells being formed with flanges 51 which are adapted to lie under the top plate 11, flanges 52 on the forgings being adapted to extend through suitably formed apertures in the top plate 11. The top plate is welded to the flanges 51 and 52 as indicated at 53 in Figure 2, the elbows 48 being welded to the respective bosses 37 by fuse-welding operations. After the mating elbow and valve guide portions are forged, they are fuse-welded along the adjacent edges thereof to form the complete elbow section illustrated in Figures 1 and 2.

Exhaust pipe sections 54 are formed of mating drop-forgings as illustrated in Figure 6, these mating portions being welded along the longitudinal edges 55 and 56 to form the complete section of pipe as illustrated in Figures 1 and 2. One end of the exhaust pipes is fuse-welded along the line 57 in Figure 2 to the cooperating and mating edges of the elbows 48 to form the complete exhaust pipe formation required. The inlet pipes 58, together with the elbows therefor are formed in a manner similar to that described in connection with the exhaust pipes and elbows, the ends of the pipes being welded at 59 to an inlet manifold 60.

The downwardly extending front wall portion 15 is recessed at 61 as illustrated in Figures 1 and 4, and the front wall portion 17 is recessed at 62 as also indicated in Figures 1 and 4. The walls, of course, are recessed at spaced intervals to receive the exhaust and inlet pipes 54 and 58 which are welded in these recesses.

The deck sections are formed with apertures 63 through which cooling fluid may flow from the cylinder block of the engine, baffles 64 being provided to direct the flow thereof initially about the hottest portions of the bottom plate. An oil pipe 65 is provided between the bottom plate and top plate 11 to carry oil from the cam shaft to the rocker arms, this pipe being welded in suitably formed bosses in the recessed members.

From the foregoing, it will be apparent that an engine head has been provided which is formed of a minimum number of parts each of which is of simple construction, the parts being welded together by simple and effective welding operations. The construction of the parts is such as to simplify the manufacture and assembling operations and to impart great strength to the elements of the head. This is particularly true in connection with the valve guides and inlet and exhaust elbows and pipes since they are additionally strengthened by reason of the formation thereof by drop forgings which include portions of the valve guides, as well as the respective elbows.

While the invention has been described with specific reference to the accompanying drawings, it is not to be limited, save as defined in the appended claims.

I claim as my invention:

1. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, and inlet and exhaust pipes welded to other of the bosses.

2. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, inlet and exhaust pipes welded to other of the bosses, and an annular insert welded in the bottom plate at the exhaust outlet thereof.

3. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, inlet and exhaust pipes welded to other of the bosses, and tubes welded to other of the bosses.

4. An engine head having a bottom plate, a top plate, end and back walls formed from a single piece of metal welded to the bottom plate, the metal having a flange forming a portion of the front wall, a front wall welded to the flange, and inlet and exhaust pipes welded to the bottom plate and front wall, said pipes being formed of a plurality of portions welded together.

5. An engine head having a bottom plate, a top plate, end and back walls formed from a single piece of metal welded to the bottom plate, the metal having a flange forming a portion of the front wall, a front wall welded to the flange, and inlet and exhaust pipes welded to the bottom plate and front wall, said pipes being formed of a plurality of portions including elbows welded together.

6. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, inlet and exhaust pipes welded to other of the bosses, and valve guides formed on the pipes.

7. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, inlet and exhaust pipes welded to other of the bosses, and valve guides formed on the pipes and welded to the top plate.

8. An engine head having a bottom plate, a top plate, end and back walls formed from a single piece of metal welded to the bottom plate, the metal having a flange forming a portion of the front wall, a front wall welded to the flange, and inlet and exhaust pipes welded to the bottom plate and front wall, said pipes being formed of a plurality of portions including elbows welded together, the elbows having valve guides formed thereon and welded to the top plate.

9. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, inlet and exhaust pipes welded to other of the bosses, each of the pipes including elbow portions welded together, and each of the elbow portions having formed thereon valve guide portions welded together.

10. An engine head having a bottom plate, end walls, front and back walls and a top plate, the bottom plate being formed with a plurality of upwardly extending bosses terminating in a plane parallel to the bottom plate, combustion chamber forming member welded to one of the bosses, the combustion chamber forming member having bosses lying in a vertical plane, a spark plug recess forming member welded to the back wall, and bosses on the last named member lying in a vertical plane cooperating with the bosses on the combustion chamber forming member and welded thereto.

11. An engine head having a bottom plate, end walls, front and back walls and a top plate, the bottom plate being formed with a plurality of upwardly extending bosses terminating in a plane parallel to the bottom plate, a combustion chamber forming member welded to one of the bosses, the combustion chamber forming member having bosses lying in a vertical plane, a spark plug recess forming member welded to the back wall, and bosses on the last named member lying in a vertical plane cooperating with the bosses on the combustion chamber forming member and welded thereto, all of the cooperating surfaces to be welded of the members forming the head being parallel and abutting.

BRUNO LOEFFLER.